United States Patent [19]
Rushing

[11] Patent Number: 5,944,269
[45] Date of Patent: Aug. 31, 1999

[54] GRINDER SHROUD

[75] Inventor: Tatsuo Rushing, Ringwood, N.J.

[73] Assignee: The Procter & Gamble Company, Cinncinnati, Ohio

[21] Appl. No.: 08/939,328

[22] Filed: Sep. 29, 1997

[51] Int. Cl.$^6$ .................................................. A47J 42/00
[52] U.S. Cl. ......................................................... 241/100
[58] Field of Search ........................... 241/100; D7/392, D7/397, 399, 373

[56] References Cited

U.S. PATENT DOCUMENTS

| | | | |
|---|---|---|---|
| D. 182,481 | 4/1958 | Schuhmann | D55/1 |
| D. 290,332 | 6/1987 | Foley et al. | D7/373 |
| D. 295,359 | 4/1988 | Nidiffer et al. | D7/373 |
| D. 328,007 | 7/1992 | Mondry et al. | D7/589 |
| D. 361,919 | 9/1995 | Fouquet | D7/373 |
| 3,907,216 | 9/1975 | MacKissic et al. | 241/186.1 X |
| 3,991,947 | 11/1976 | Schlessel | 241/169.1 |
| 4,685,624 | 8/1987 | Nidiffer et al. | 241/36 |
| 4,714,206 | 12/1987 | Nidiffer et al. | 241/100 |
| 4,813,622 | 3/1989 | Nidiffer et al. | 241/100 |
| 5,125,542 | 6/1992 | Blanc | 222/181 |
| 5,172,868 | 12/1992 | Midden | 241/246 |
| 5,458,295 | 10/1995 | Haber et al. | 241/100 |

FOREIGN PATENT DOCUMENTS

| | | |
|---|---|---|
| 2633174 | 6/1988 | France . |
| 2525426 A1 | 12/1976 | Germany . |
| 3343118 A1 | 6/1984 | Germany . |
| 1488372 | 10/1977 | United Kingdom . |
| WO 96/33128 | 10/1996 | WIPO . |

*Primary Examiner*—Joseph J. Hail, III
*Assistant Examiner*—William Hong
*Attorney, Agent, or Firm*—Vanessa M. Nichols; Rodney M. Young

[57] ABSTRACT

An aesthetically and functionally improved shroud for covering a grinder device while improving the consumer shopping experience. The shroud is formed of a faceplate with a first opening for receiving and directing items, such as coffee beans, to be ground to a grinder device and a second opening positioned to allow a consumer to place a bag under the opening in order to collect the ground coffee from the grinder. A funnel device is used in connection with the first opening to assist in directing the items to be ground into the grinder.

20 Claims, 3 Drawing Sheets

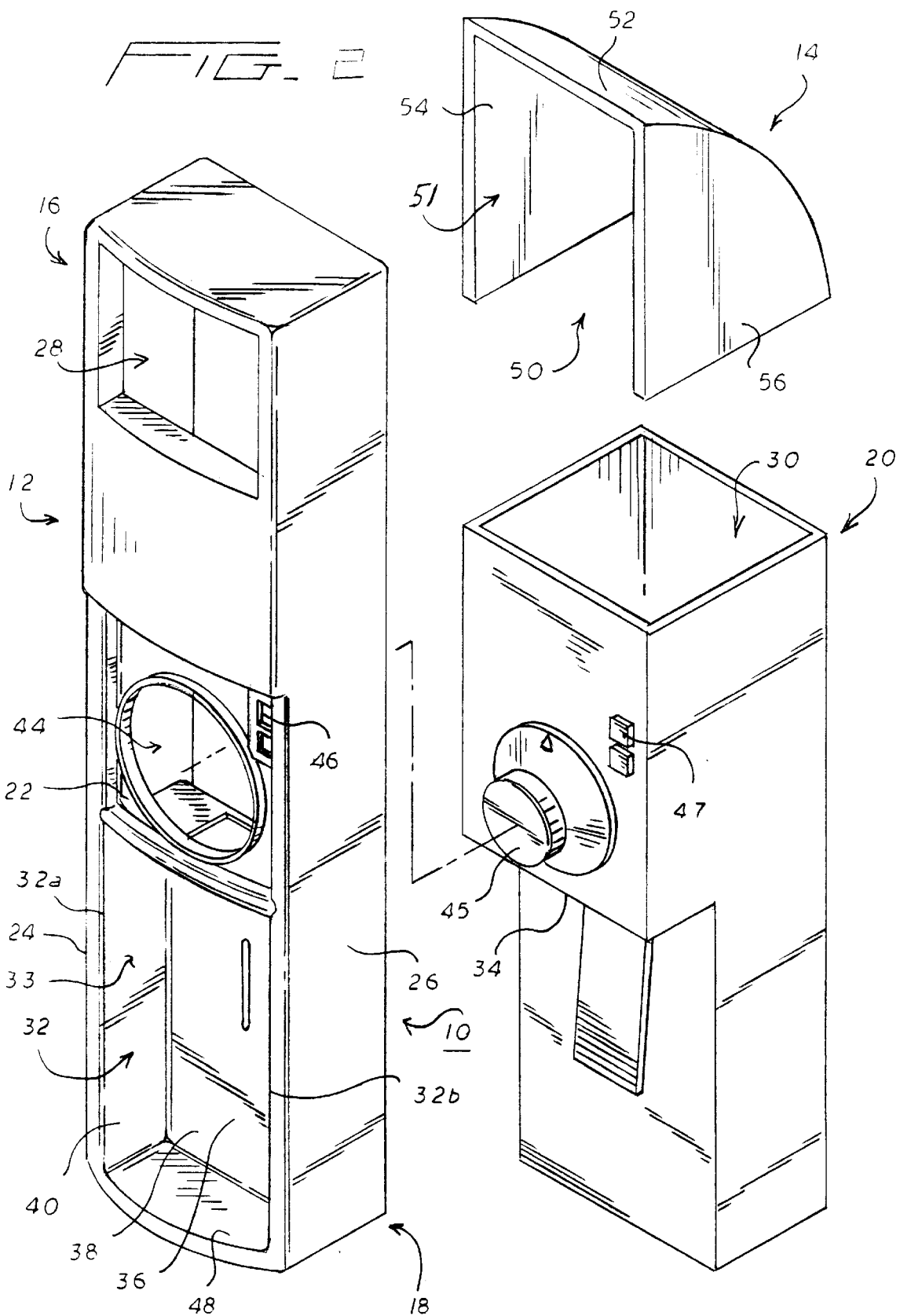

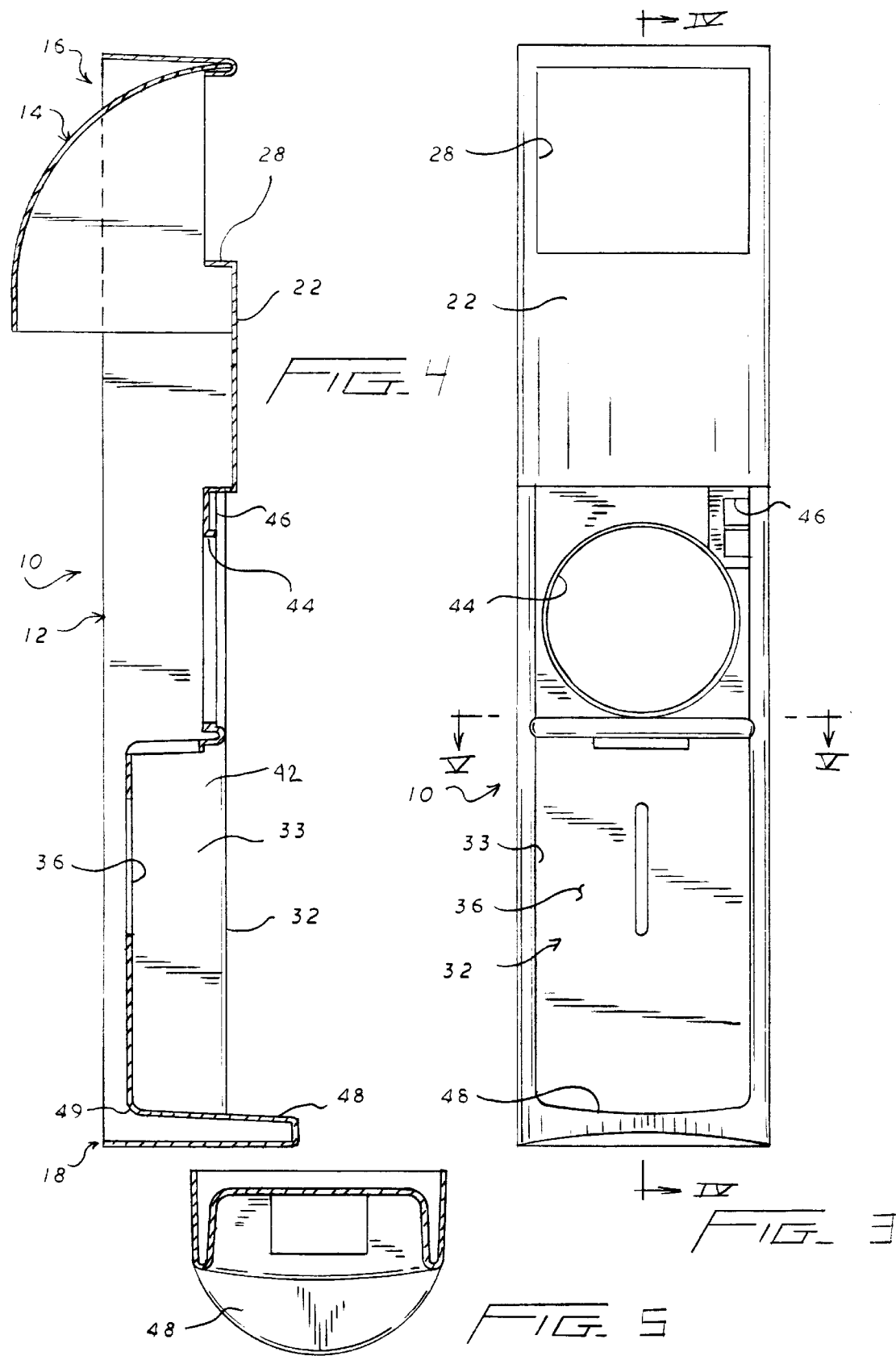

GRINDER SHROUD

FIELD OF THE INVENTION

The invention relates to a shroud for covering a coffee grinder or food processor for use by individual consumers while being located in places frequented by the general public.

BACKGROUND OF THE INVENTION

Current bulk coffee display units generally include a set of bulk bins for holding coffee beans and a grinder for grinding the coffee beans. These displays are most often found in local supermarkets, coffee shops and other commercial boutiques where coffee is consumed and/or distributed. Each bin usually contains a different flavor of coffee bean and includes a nozzle for dispensing a desired amount of coffee beans. The grinder is commonly located on a shelf adjacent to the set of coffee bins and is merely displayed with the exterior housing of the grinder showing; the same as when the grinder was originally purchased from the grinder manufacturer.

Several grinders can be located within a single coffee display. Typically, the number of grinders included depends upon the number of coffee bins and the volume of commercial usage. The most common configuration of grinders allow the coffee beans to be emptied into the grinder from an opening located on the top surface of the grinder. This can be a problem for consumers that are not tall enough to reach the opening on top of the grinder. Further, as the coffee beans are poured from the bag into the grinder, coffee beans are often spilled onto the display unit and onto the floor creating product waste and unnecessary messes. Such spillage of product can create a potentially hazardous situation and can detract from the shopping pleasure of the consumers.

A common problem with such grinders and display units is that consumers are often uncertain where the coffee beans should be inserted for grinding. This problem can result in product failure and consumer dissatisfaction.

Another problem with current display units is confusion regarding the collection of the freshly ground coffee. In many instances consumers are puzzled as to exactly where the grounds come out of the grinder, and may not properly position their collection bag. This can result in a failure to collect all the coffee grounds. Consequently, a substantial loss in revenues will be encountered due to the wasted product.

Another potential problem is created when objects other than coffee beans fall into the grinder. This can create costly damage to the grinder and is a potential safety hazard.

A need, therefore, exists for a structure improving the functionality and appearance of grinders employed at various publicly accessible, commercial locations such as grocery stores and retail outlets. The present invention provides a shroud which overcomes many of the shortcomings associated with the prior grinders and display units.

SUMMARY OF THE INVENTION

It is, therefore, an object of the present invention to provide a shroud for covering a food processing unit, more preferably, a grinder, wherein the grinder includes a grinder intake opening and a grinder outlet. The shroud includes a faceplate shaped and dimensioned or configured to substantially cover a front portion of the grinder. The faceplate includes a first opening and a second opening. The first opening is sized to permit the introduction of the intended material into the grinder intake opening and is accordingly positioned to be adjacent the grinder intake opening when the shroud is mounted or installed over the grinder. The second opening is sized to permit the reception of ground or processed material coming from the grinder outlet and is accordingly positioned to be adjacent the grinder outlet when the shroud is mounted or installed over the grinder. The shroud also includes a funnel, configured to fit within the first opening, wherein the funnel defines a passageway having a first aperture and a second aperture. The first aperture of the funnel is substantially aligned with the first opening and the second aperture is positioned such that it forms a pathway from the faceplate to the grinder intake opening. The shroud further includes a back plate integrally formed with the faceplate to define an enclosure in which a collection device can be placed to gather ground material exiting the grinder outlet, wherein the enclosure is accessed through the second opening and includes an outlet opening through which material exiting the grinder outlet can enter the enclosure.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 2 is an exploded view of the shroud and the grinder;

FIG. 3 is a front view of the shroud;

FIG. 4 is a cross sectional view of the shroud along the line IV—IV in FIG. 3; and, FIG. 5 is a cross sectional view of the shroud along the line V—V in FIG. 3.

DETAILED DESCRIPTION OF THE INVENTION

Figure 1:
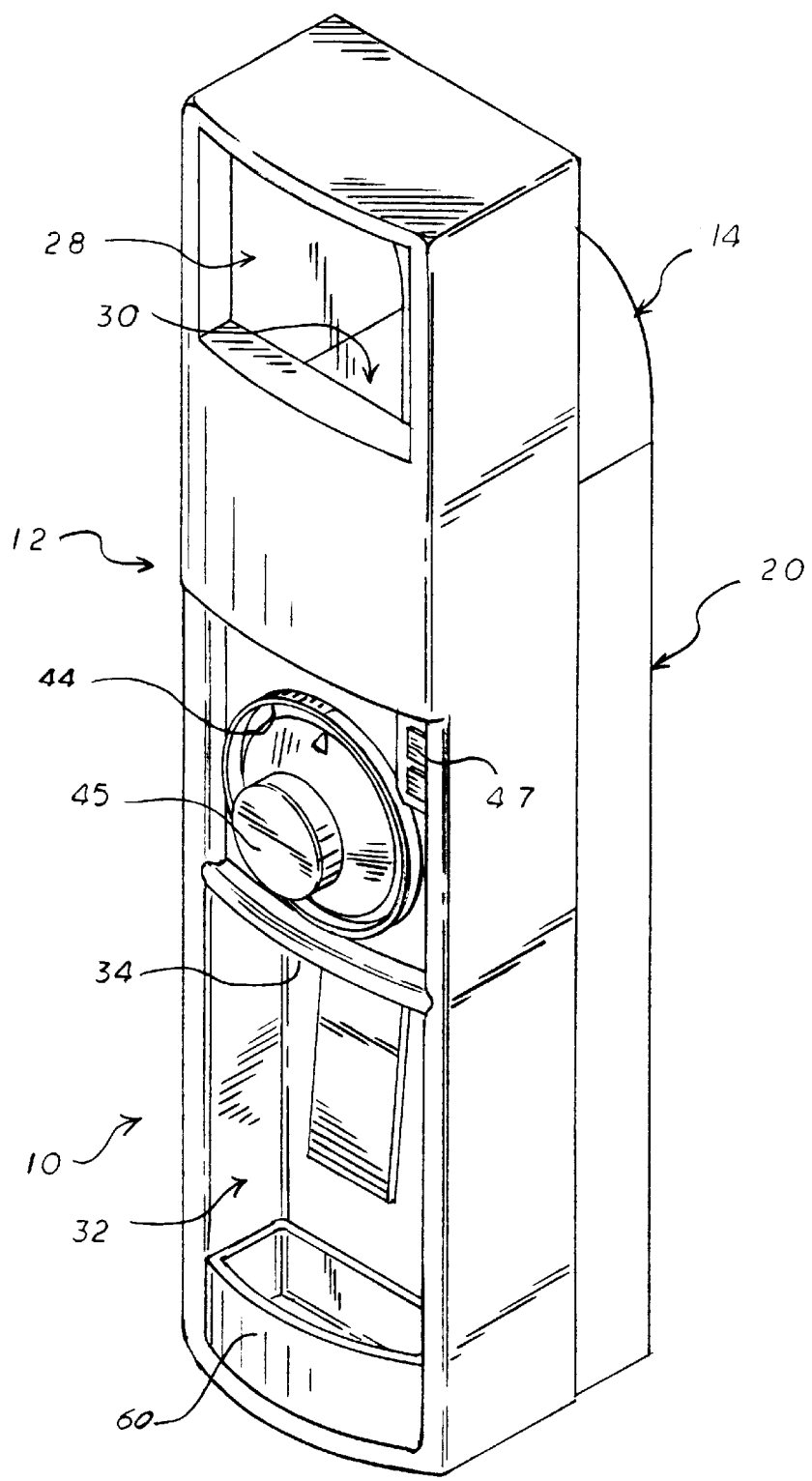
FIG. 1 is a perspective view of the shroud mounted over a grinder.

The present shroud 10 is structured to provide an aesthetically and functionally improved cover or enclosure for coffee bean grinders, while also improving the consumer shopping experience. This task is achieved by providing a shroud 10 which prevents spillage of preground coffee beans, thereby maintaining a neat environment in the area around the coffee dispenser and grinder. The present shroud 10 also saves the merchant money associated with wasted coffee beans and employee time spent on cleaning. Though this disclosure is directed to a shroud 10 for a coffee bean grinder, it is possible to use the shroud with other devices, such as food processing units, without departing from the scope of this invention.

With reference to FIGS. 1 through 5, a shroud 10 for covering a grinder 20 is illustrated. The shroud 10 includes a faceplate 12 and an associated funnel lid 14. The faceplate 12 is an elongated member defining an upper end 16 and a lower end 18. The faceplate 12 is constructed and sized or configured to substantially cover the exterior of a conventional coffee grinder 20. Further, the faceplate 12 is preferably formed as a single integral unit that substantially covers the face of the grinder 20 and forms an enclosure covering the sides of the grinder 20. While the faceplate 12 is disclosed as a single unit, the faceplate 12 could be constructed from multiple elements without departing from the spirit of this invention.

The shroud 10 is preferably integrally molded from polycarbonate, polypropylene, acrylic, styrene, styreneacrylonitrile, polyethylene terephthalate, or polyethylene. However, the shroud 10 can be made from various formable materials including, but not limited to hard and soft plastics, metals or glass. Further, the shroud 10 is maintained in position over the grinder 20 by a friction fit and/or adhesive. However, various other mechanisms can be employed to maintain the shroud 10 on the grinder 20 without departing from the spirit of the present invention. Alternatively, the shroud 10 can be formed in the same assembly as the grinder 20, making the shroud 10 an integral part of the grinder housing.

As illustrated, the faceplate 12 is defined by a first side 22, a second side 24 and a third side 26. In this illustrative embodiment, the second side 24 and third side 26 are each positioned about 90 degrees planar to the first side 22, and are substantially parallel to each other.

A first opening 28 is located in the upper half of the first side 22 of the faceplate 12. The first opening 28 is located in the faceplate 12 such that it is planar parallel to the front edge of the grinder 20 and planar perpendicular to the grinder intake opening 30 when the shroud 10 is mounted to the grinder 20 as will be discussed in greater detail below. Though a perpendicular orientation between the first opening 28 and the grinder intake opening 30 has been disclosed, alternate orientations between these two openings are possible without departing from the spirit of this invention. Wherever the first opening 28 is positioned, it should be designed to avoid consumer confusion as to where to insert the preground coffee beans. In addition, the first opening 28 should be of a sufficient size to allow a user to introduce the intended material or product, for example, coffee beans, into the grinder 20.

A second opening 32 is located below the first opening 28 on the faceplate 12. The second opening 32 is positioned such that it aligns with the grinder outlet 34 when the shroud 10 is mounted to the grinder 20. The second opening 32 is designed to allow for the collection of ground material. As with the first opening 28, the second opening 32 is positioned in the first side 22 of the faceplate 12.

The second opening 32 provides access to an enclosure 33 sized to receive various collection devices, for example, various sizes of prefabricated collection bags used to collect ground coffee dispensed from the grinder 20. In this illustrative embodiment, the enclosure 33 is defined by a back plate 36 positioned between the sides 32a, 32b of the second opening 32. Preferably, the back plate 36 is a U-shaped member coupled to the sides 32a, 32b of the second opening 32 to form the enclosure 33. As such, the back plate 36 includes a first wall 38, a second wall 40, and a third wall 42. The back plate 36 is substantially the same height as the second opening 32 to create the appearance of an enclosed space in which a collection bag should be placed. The enclosure 33 is, however, open at its top to permit the flow of ground coffee from the grinder outlet 34.

In use, the second and third walls 40 and 42 of the back plate 36 provide a guide to align the collection bag within the enclosure 33 of shroud 10. Further, the first wall 38 of the back plate 36 provides a maximum depth for the bag being placed through the second opening 32 and into the enclosure 33. The combination of these three elements define the enclosure 33 and provide a proper way to maintain the collection bag in line with ground coffee being dispensed from the grinder outlet 34. The enclosure 33 also prevents spilled coffee beans from spreading about the base of the grinder 20.

While the first and second openings 28, 32 are disclosed with a particular orientation, they can be reoriented to suit various grinders without departing from the spirit of this invention.

A third opening 44 is positioned in faceplate 12. The third opening 44 is sized and positioned to allow a grinder control knob 45 to protrude therethrough such that a consumer can readily access the control knob 45. Though the position of the third opening 44 is illustrated as being below the first opening 28, the position of the third opening 44 can be moved to conform with the position of a variety of grinder control knob 45.

Further, a fourth opening 46 is provided in the faceplate 12. The fourth opening 46 is sized and positioned to allow the consumer access to a grinder power switch 47. After dumping the coffee beans, aligning the collection bag and setting the control knob 45 to a desired fineness for the coffee grounds, the consumer can start the grinding process by toggling the power switch 47.

The shroud is further provided with a base 48 that extends outwardly from the back plate 36. The base 48 provides a way of supporting or holding the consumer's collection bag during the grinding process. The base 48 can be integrally formed with the lower end 18 of the faceplate 12, and the lower end 49 of the back plate 36. The base 48, however, can alternatively be removable from the shroud 10 in order to facilitate cleaning of the coffee grounds from the enclosure 33. Moreover, the base 48 can be coupled to the shroud 10 in various ways without departing from the scope of this invention.

The base 48 forms a shelf on which a removable collection tray 60 can rest or be secured thereto by any conventional means such as interlocking slots. The tray 60 functions to hold a collection bag to provide the consumer with a hands-free collection option. This enables the consumer to pour the preground coffee beans into the grinder 20, adjust the grinder control knob and start the grinding process without holding the collection bag. In addition, the tray 60 functions to collect any excess grounds which are not collected in the bag during operation. The tray can then be removed and its contents dumped into the trash, thereby keeping the shroud's overall appearance aesthetically pleasing.

In alternate embodiments, the base 48 can be varied in size and shape. As best illustrated in FIGS. 4 and 5, the base 48 protrudes outwardly past the first side 22 to form a longer shelf. This is beneficial since collection bags are not all uniform and may not exactly conform to the size of the enclosure formed by the second opening 32. However, bases of various other shapes can be employed without departing from the spirit of the present invention.

The funnel lid 14 is sized to fit within the first opening 28. As such, the funnel lid 14 is arcuately shaped to guide the coffee beans through the first opening 28 and into the grinder intake opening 30. The funnel lid 14 provides a structure to guide all the coffee beans from the consumer's bag into the grinder intake opening 30 while preventing coffee beans from being spilled. This effectively eliminates messes and waste. The funnel lid 14 also provides a cover for the grinder intake opening 30. The provision of the cover prevents objects from inadvertently falling into the grinder intake opening 30. In addition, the shape of the funnel lid 14 helps to prevent individuals from placing their hands too close to the grinder intake opening 30.

As such, the funnel lid 14 defines at least two apertures 50, 51 for directing the flow of material into the grinder 20. The funnel lid 14 also includes a back 52 and two opposed sides 54, 56 connected to the back 52, forming the pathway through which the coffee beans pass as they are poured or dumped into the grinder intake opening 30. However, funnels of different shapes and sizes, can be used without departing from the scope of this invention.

Upon assembly of the grinder 20 to the faceplate 12, the funnel lid 14 is affixed between the grinder 20 and the faceplate 12. The funnel lid 14 can be coupled in a desirable position in various ways, including, but not limited to, friction fitting, adhesive, or with some type of clip, slot or snap assembly.

The first aperture 51 of the funnel lid 14 is aligned with the first opening 28 on the faceplate 12. The funnel lid 14 is affixed such that the first aperture 51 is sized to form a conduit directing coffee beans through the first opening 28, into the funnel lid 14 and towards the second aperture 50. Though an illustrative embodiment depicts the plane of the first aperture 51 perpendicularly oriented with respect to the plane of the second aperture 50, alternate relative orientations between the first and second apertures 50, 51 could be used without departing from the spirit of the invention.

The second aperture 50 is located directly over the grinder intake opening 30. Once assembled, the faceplate 12 and funnel lid 14 form a complete unit that guides all items introduced into the first opening 28 on into the grinder intake opening 30.

Although the shroud 10 has been primarily disclosed for directing coffee beans to the grinder 20, the shroud 10 can also prevent objects other than coffee beans from falling into the grinder 20. This can avoid costly damage to the grinder 20 and can eliminate potential safety hazards.

While the preferred embodiments have been shown and described, it will be understood that there is no intent to limit the invention by such disclosure, but rather, it is intended to cover all modifications and alternate constructions falling within the spirit and scope of the invention as defined in the appended claims.

What is claimed is:

1. A shroud for covering a food processing unit, wherein the food processing unit includes a food processor and a housing having an intake opening and an outlet, comprising:
   a faceplate configured to substantially cover a front portion of the housing, the faceplate includes an upper end and a lower end;
   the faceplate includes a first opening and a second opening, wherein the first opening is sized to permit the introduction of a material into the intake opening and is accordingly positioned to be adjacent the intake opening when the shroud is installed over the housing, and the second opening is sized to permit the reception of ground material coming from the outlet and is accordingly positioned to be adjacent the outlet when the shroud is installed over the housing;
   a funnel lid, configured to fit within the first opening, the funnel lid defines a passageway having a first aperture and a second aperture wherein the first aperture of the funnel lid is substantially aligned with the first opening and the second aperture is positioned such that it forms a pathway from the faceplate to the intake opening, wherein the funnel lid creates a cover over the intake opening and help to prevent individuals from placing their hands too close to the intake opening; and
   a back plate formed with the faceplate to define an enclosure in which a collection device can be placed to gather ground material exiting the outlet, wherein the enclosure is accessed through the second opening and includes an outlet opening through which material exiting the outlet can enter the enclosure.

2. The shroud according to claim 1, wherein the faceplate is defined by at least two sides.

3. The shroud according to claim 1, wherein the faceplate comprises a first side, a second side and a third side, and wherein the second side and the third side are integral to the first side.

4. The shroud according to claim 1, wherein the shroud is integrally molded from plastic.

5. The shroud according to claim 1, wherein the first aperture of the funnel lid is oriented perpendicular to the second aperture and wherein the first and second apertures are connected by an integral unit defining a conduit.

6. The shroud according to claim 1, further including a base integral with the lower end of at least a portion of the faceplate to define a shelf configured to support and position a collection device in the path of the outlet to aid in collecting all the ground material exiting the food processing unit.

7. The shroud according to claim 6, wherein the defined shelf forms a base of the enclosure.

8. The shroud according to claim 6, wherein the back plate is coupled to the base along a lower edge of the back plate.

9. The shroud according to claim 6, wherein the faceplate comprises a first side, a second side and a third side, and wherein the second side and the third side are integral to the first side.

10. The shroud according to claim 6, wherein the food processing unit is a coffee bean grinder.

11. A grinder unit provided with a shroud to ensure the convenient use of the grinder unit, the grinder unit comprising:
    a controllable grinding mechanism for grinding the received material into a desired size granule, a grinder housing having an intake opening for receiving materials to be ground and an outlet for dispensing the ground materials;
    the shroud comprising a faceplate configured to substantially cover a front portion of the grinder housing, the faceplate includes an upper end and a lower end;
    the faceplate includes a first opening and a second opening, wherein the first opening is sized to permit the introduction of an intended material into the grinder intake opening and is accordingly positioned to be adjacent the grinder intake opening when the shroud is installed over the grinder housing, and the second opening is sized to permit the reception of ground material coming from the grinder outlet and is accordingly positioned to be adjacent the grinder outlet when the shroud is installed over the grinder housing;
    a funnel lid, configured to fit within the first opening, the funnel lid defines a passageway having a first aperture and a second aperture wherein the first aperture of the funnel lid is substantially aligned with the first opening and the second aperture is positioned such that it forms a pathway from the face plate to the grinder intake opening, wherein the funnel lid creates a cover over the grinder intake opening which can prevent objects from inadvertently falling into the grinder intake opening and helps prevent individuals from placing their hands too close to the grinder intake opening; and
    a back plate integrally formed with the faceplate to define an enclosure in which a collection device can be placed to gather ground material exiting the grinder outlet, wherein the enclosure is accessed through the second opening and includes an outlet opening through which material exiting the grinder outlet can enter the enclosure.

12. The grinder provided with a shroud according to claim 11, wherein the faceplate is defined by at least two sides.

13. The grinder provided with a shroud according to claim 11, wherein the faceplate comprises a first side, a second side and a third side, and wherein the second side and the third side are integral to the first side.

14. The grinder provided with a shroud according to claim 11, wherein the shroud is integrally molded from plastic.

15. The grinder provided with a shroud according to claim 11, wherein the first aperture of the funnel lid is oriented perpendicular to the second aperture and wherein the first and second apertures are connected by an integral unit defining conduit.

16. The grinder provided with a shroud according to claim 11, further including a base integral with the lower end of at least a portion of the faceplate to define a shelf configured to support and position a collection device in the path of the grinder outlet to aid in collecting all the ground material exiting the grinder.

17. The grinder provided with a shroud according to claim 16, wherein the defined shelf forms a base within the enclosure.

18. The grinder provided with a shroud according to claim 16, wherein the back plate is coupled to the base along a lower edge of the back plate.

19. The grinder provided with a shroud according to claim 16, wherein the faceplate comprises a first side, a second side and a third side, and wherein the second side and the third side are integral to the first side.

20. The grinder provided with a shroud according to claim 16, wherein the shroud is made from plastic.

* * * * *